United States Patent
Sgarz et al.

(10) Patent No.: US 9,335,147 B2
(45) Date of Patent: May 10, 2016

(54) MANUAL POSITIONING DEVICE

(75) Inventors: Heiko Sgarz, Leonberg (DE); Tobias Zibold, Stuttgart (DE)

(73) Assignee: Robert Bosch GmbH, Stuttgart, DE (US)

( * ) Notice: Subject to any disclaimer, the term of this patent is extended or adjusted under 35 U.S.C. 154(b) by 748 days.

(21) Appl. No.: 13/699,183

(22) PCT Filed: Feb. 1, 2011

(86) PCT No.: PCT/EP2011/051379
§ 371 (c)(1),
(2), (4) Date: Mar. 7, 2013

(87) PCT Pub. No.: WO2011/144363
PCT Pub. Date: Nov. 24, 2011

(65) Prior Publication Data
US 2013/0204566 A1 Aug. 8, 2013

(30) Foreign Application Priority Data
May 21, 2010 (DE) .................. 20 2010 007 111 U

(51) Int. Cl.
*G01B 7/00* (2006.01)
*G01S 7/03* (2006.01)
*G01S 7/40* (2006.01)
*G01S 13/88* (2006.01)

(52) U.S. Cl.
CPC . *G01B 7/003* (2013.01); *G01S 7/03* (2013.01); *G01S 7/032* (2013.01); *G01S 7/4008* (2013.01); *G01S 7/4017* (2013.01); *G01S 7/4052* (2013.01); *G01S 13/887* (2013.01); *G01S 2007/4065* (2013.01)

(58) Field of Classification Search
CPC ....... G01S 7/03; G01S 7/4008; G01S 7/4052; G01S 2007/4065; G01S 7/032; G01S 7/4017; G01S 13/887; G01B 7/003
USPC ................ 702/94, 150; 455/63.1; 340/12.52; 700/295
See application file for complete search history.

(56) References Cited

U.S. PATENT DOCUMENTS

| 5,376,938 A | 12/1994 | Martinez et al. |
| 5,430,446 A | 7/1995 | Okamura |
| 5,815,086 A * | 9/1998 | Ivie et al. .................... 340/12.52 |
| 7,949,304 B2 * | 5/2011 | Mostafa et al. .............. 455/63.1 |
| 2004/0004905 A1 | 1/2004 | Lyon et al. |
| 2006/0248479 A1 * | 11/2006 | Hilbich et al. ................ 715/864 |
| 2007/0135973 A1 * | 6/2007 | Petite ............................ 700/295 |

FOREIGN PATENT DOCUMENTS

| DE | 10 2004 023 998 A1 | 12/2005 |
| DE | 10 2005 007 803 A1 | 8/2006 |
| DE | 10 2006 058 852 A1 | 6/2008 |

OTHER PUBLICATIONS

International Search Report corresponding to PCT Application No. PCT/EP2011/051379, mailed Apr. 12, 2011 (German and English language document) (5 pages).

* cited by examiner

*Primary Examiner* — Carol S Tsai
(74) *Attorney, Agent, or Firm* — Maginot, Moore & Beck LLP

(57) ABSTRACT

A manual positioning device includes at least one receiver, a reference network, a first switch, and at least one second switch. The at least one second switch, together with the first switch, is configured to switch at least two different reference signal paths for determining reference signals on the reference network.

9 Claims, 3 Drawing Sheets

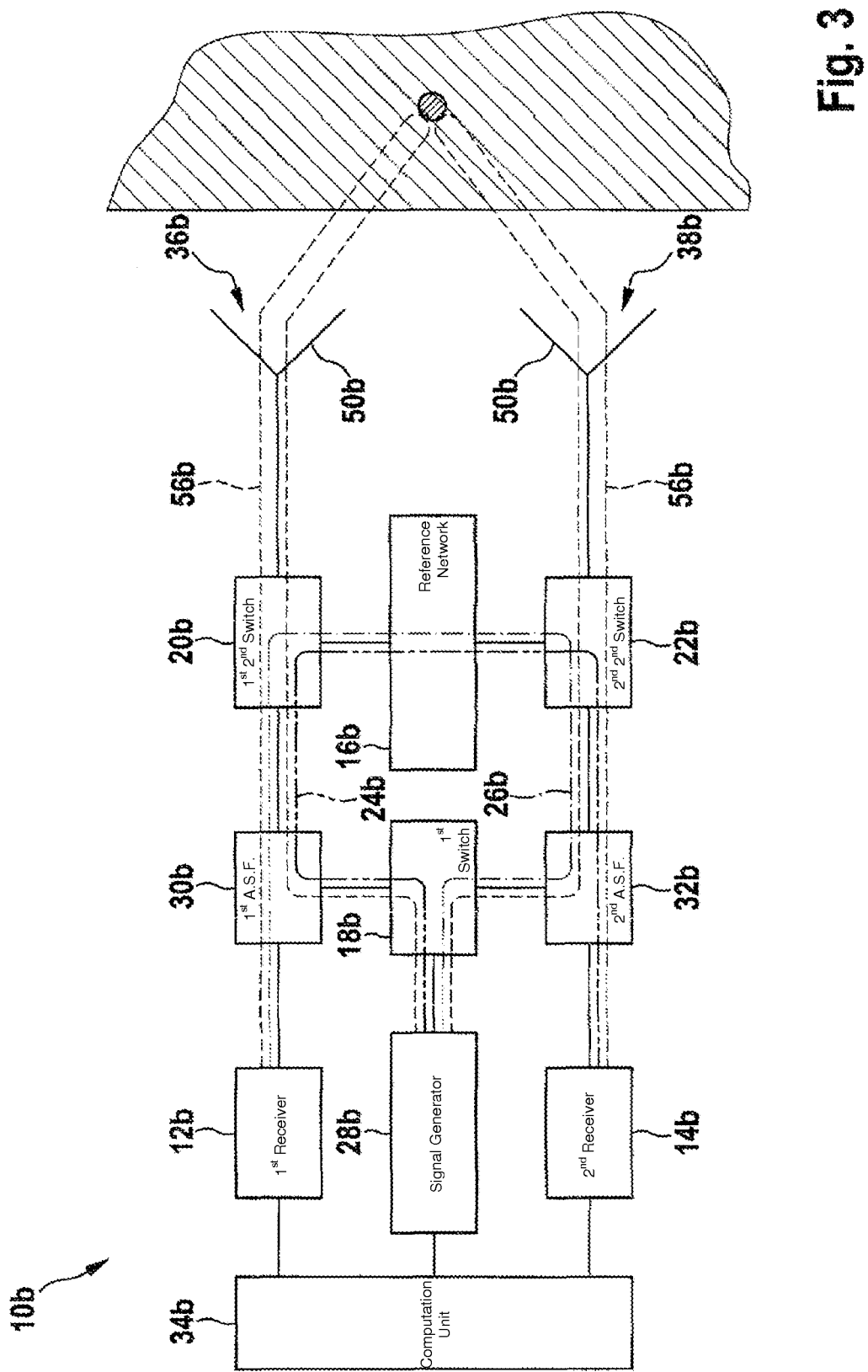

MANUAL POSITIONING DEVICE

This application is a 35 U.S.C. §371 National Stage Application of PCT/EP2011/051379, filed on Feb. 1, 2011, which claims the benefit of priority to Serial No. DE 20 2010 007 111.9, filed on May 21, 2010 in Germany, the disclosures of which are incorporated herein by reference in their entirety

BACKGROUND

The disclosure is based on a hand-held locating appliance apparatus as described herein.

A hand-held locating appliance apparatus having at least a receiver, a reference network and a first switch has already been proposed.

SUMMARY

The disclosure is based on a hand-held locating appliance apparatus having at least a receiver, a reference network and a first switch.

It is proposed that the hand-held locating appliance apparatus have at least one second switch which is provided, together with the first switch, to connect at least two different reference signal paths to the reference network for the purpose of determining reference signals. A "receiver" is intended to be understood to mean particularly an element which decodes a piece of information contained in a received signal and/or one of the reference signals and advantageously determines a value profile, that is to say a value over a time. Preferably, the receiver has at least one analog-to-digital converter. The term "reference network" is intended to be understood to mean particularly a circuit which emulates at least one portion of a transmission and/or reception channel. Preferably, the reference network has at least one filter, a balancing element and/or advantageously an attenuator. Advantageously, at least one region of the reference network has an identical spatial structure to the transmission and/or reception channel. Alternatively and/or additionally, the reference network could have regions which emulate a response from the transmission and/or reception channel, particularly a temperature-dependent response. In particular, a "switch" in this context is intended to be understood to mean an element which is provided to couple a signal selectively to at least two at least partially different signal paths. Advantageously, the switch is in the form of a semiconductor switch. Alternatively, the switch could be in the form of a mechanical switch, for example in the form of a coaxial switch. "Provided" is intended to be understood to mean particularly specifically programmed, designed, equipped and/or connected. In particular, the term "signal path" is intended to be understood to mean an operative electrical connection between two points. A "reference signal path" is intended to be understood to mean particularly a signal path for transmitting a reference signal. In particular, a "reference signal" is intended to be understood to mean a signal which has at least one piece of information about a state, particularly an environment-dependent state, of the transmission and/or reception channel and/or advantageously provides said information particularly for the receiver. Preferably, the state is dependent on the temperature, humidity and/or another disturbance variable which appears meaningful to a person skilled in the art. The inventive refinement of the hand-held locating appliance apparatus allows particularly effective compensation for disturbance variables, particularly temperature compensation and compensation for other disturbance variables, such as humidity, to be achieved simply in terms of design and with advantageously little outlay.

In a further refinement, it is proposed that the hand-held locating appliance apparatus have a signal generator, wherein at least the first switch is operatively arranged between the signal generator and the reference network, which means that a signal from the signal generator can be connected to one of the reference signal paths or to another path, particularly to a transmission path, simply in terms of design. In particular, a "signal generator" is intended to be understood to mean an apparatus which produces at least one transmission signal in at least one operating state. Advantageously, the signal generator also produces the reference signals. The signal generator advantageously produces a wideband radio-frequency signal, specifically particularly according to the IEEE 802.15.4a standard, and/or another radio-frequency signal which appears meaningful to a person skilled in the art. Alternatively or additionally, the signal generator could produce a signal for a capacitive measurement, an inductive measurement and/or for another measurement which appears meaningful to a person skilled in the art. The expression "operatively arranged in-between" is intended to be understood to mean particularly that the switch can be used to switch at least one of the reference signal paths from the signal generator to the reference network.

Furthermore, it is proposed that the hand-held locating appliance apparatus have an antenna separating filter, wherein the second switch is operatively arranged between the reference network and the antenna separating filter, as a result of which the signal from the signal generator can be connected to an antenna or to the reference network simply in terms of design. An "antenna separating filter" is intended to be understood to mean particularly an apparatus which, during transmission, routes a signal from the signal generator in the direction of an antenna and which during reception, routes a received signal from the antenna in the direction of the receiver. Preferably, the antenna separating filter is in the form of a directional coupler, specifically in a form which appears meaningful to a person skilled in the art. Alternatively, the antenna separating filter could be in the form of a circulator. Preferably, the hand-held locating appliance apparatus is in the form of a monostatic hand-held locating appliance apparatus, that is to say that it sends and receives a locating signal using the same antenna.

In addition, it is proposed that the two switches be provided to connect a reference signal path for the purpose of determining crosstalk, as a result of which the crosstalk can be determined and advantageously determined and calculated from a locating measurement. Preferably, the reference signal used for determining crosstalk remains unsent. "Crosstalk" is intended to be understood to mean particularly a signal, specifically a portion of the reference signal, which the antenna separating filter unintentionally couples in the direction of the receiver. Preferably, the crosstalk equates to a signal which the antenna separating filter unintentionally couples in the direction of the receiver during the transmission of a locating signal.

In addition, it is proposed that the two switches be provided to connect a reference signal path for the purpose of determining a normalization signal, as a result of which corruption of the received signal by an alteration—particularly a temperature-dependent alteration—in the transmission and reception channels can be determined and calculated. A "normalization signal" is intended to be understood to mean particularly a signal, specifically a component of the reference signal, which has a piece of information about a state of the reference network, which piece of information allows a state of the transmission and reception channels to be inferred. In particular, the normalization signal has a piece of information about a current gain, particularly a frequency-dependent gain, of the transmission and reception channels independently of the radio link. Preferably, the reference signal used for determining a normalization signal remains unsent. The normalization signal can be used to determine a normalization factor. A "normalization factor" is intended to be understood to mean particularly a quotient comprising a calibration signal measured under controlled conditions, particularly during factory calibration, and a normalization signal which is measured in real time with a locating measurement. By way of example, the factory calibration involves the hand-held locating appliance apparatus being tempered at a prescribed humidity over a relatively long period.

It is also proposed that the hand-held locating appliance apparatus have a computation unit which is provided to determine an at least temperature-compensated received signal particularly on the basis of the crosstalk and the normalization signal, as a result of which it is possible to achieve particularly precise locating under a wide variety of ambient conditions simply in terms of design and with little outlay on parts. A "computation unit" is intended to mean particularly a controller having a processor, a memory unit and/or an operating, control and/or calculation program stored in the memory unit. Preferably, the computation unit is in the form of a digital signal processor. Alternatively or additionally, the computation unit could be in the form of an RISC processor.

In one advantageous form of the disclosure, it is proposed that the computation unit be provided to transform at least one profile of a signal to a frequency domain, as a result of which it is possible to achieve advantageous and rapid data processing with little outlay. The expression "transform to a frequency domain" is intended to be understood to mean particularly conversion of a signal in the time domain, for example a voltage profile, to the particularly complex frequency domain. Advantageously, the computation unit has a computation routine with Fourier transformation, particularly advantageously with fast Fourier transformation. Preferably, the temperature-compensated received signal is determined at least partially in the frequency domain. Particularly subtraction of the crosstalk from a transformed value profile of the received signal and/or advantageously multiplication by the normalization factor take place in the frequency domain. Alternatively or additionally, the temperature-compensated received signal could be determined at least partially in the time domain. Particularly convolution with the normalization factor and/or advantageously subtraction of the crosstalk from an untransformed value profile of the received signal take place in the time domain.

Furthermore, it is proposed that the hand-held locating appliance apparatus have two antenna separating filters which each form part of two essentially separate transmission and reception channels, as a result of which particularly precise locating is possible, and both transmission and reception channels can be subjected to temperature compensation with little outlay. A "transmission and reception channel" is intended to be understood to mean particularly an apparatus for sending and receiving signals. Preferably, a transmission and reception channel has at least one antenna separating filter, an antenna and a receiver. In this case, "essentially separate" is intended to be understood to mean that the two transmission and reception channels have primarily separate parts and/or signal paths. Advantageously, the two transmission and reception channels are of separate design apart from the first switch and the signal generator.

In addition, it is proposed that the computation unit be provided to determine the crosstalk and the normalization signal simultaneously, as a result of which particularly rapid reference measurement which is in real time with a locating measurement and is therefore precise is possible. In this connection, "simultaneously" is intended to be understood to mean particularly that the computation unit determines the crosstalk of a transmission and reception channel in one position of the switches and determines the normalization signal of the other transmission and reception channel in the same position of the switches and particularly at an identical time.

In addition, the disclosure is based on a hand-held locating appliance having a hand-held locating appliance apparatus, wherein all hand-held locating appliances which appear meaningful to a person skilled in the art, such as particularly distance measuring appliances, humidity locating appliances and/or wall locating appliances, would be conceivable for operation with a hand-held locating appliance apparatus, as a result of which it is possible to provide a particularly precise hand-held locating appliance simply in terms of design. Advantageously, the hand-held locating appliance is provided to locate objects arranged in a wall, such as power lines and/or water lines, and/or wall properties, such as wooden elements, stone elements and/or supports, that is to say particularly to determine a distance from a wall surface.

BRIEF DESCRIPTION OF THE DRAWINGS

Further advantages can be found in the description of the drawings below. The drawing shows two exemplary embodiments of the disclosure. The drawing, the description and the claims contain numerous features in combination. A person skilled in the art will expediently also consider the features individually and will combine them into meaningful further combinations.

In the drawing:

FIG. 3 shows a schematic illustration of an alternative exemplary embodiment of the hand-held locating appliance apparatus from FIG. 1 with two transmission and/or reception channels.

DETAILED DESCRIPTION

Figure 1:
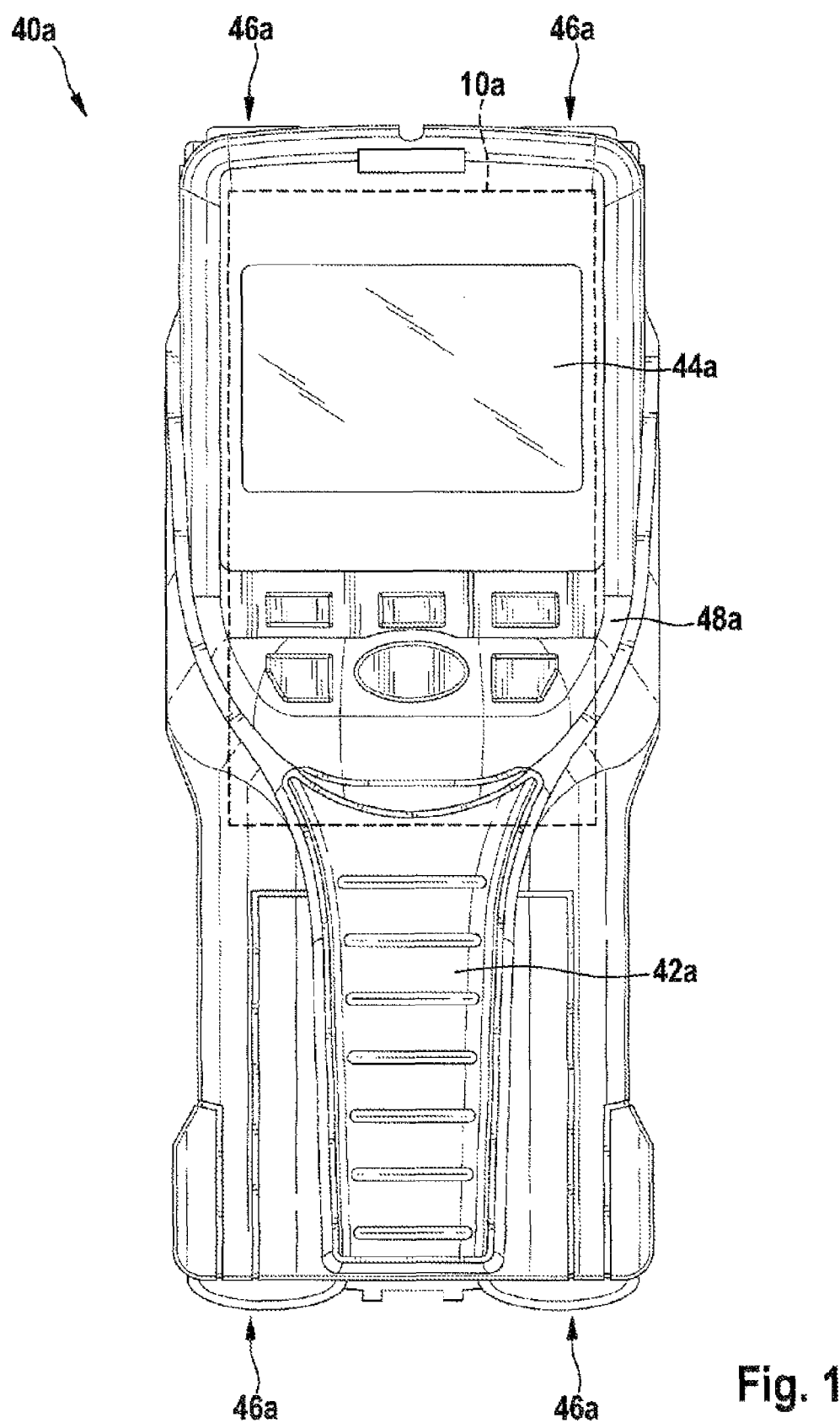
FIG. 1 shows a hand-held locating appliance according to the disclosure with a hand-held locating appliance apparatus according to the disclosure.

FIG. 1 shows a hand-held locating appliance 40a according to the disclosure with a hand-held locating appliance apparatus 10a, a grip 42a, a display 44a, four rollers 46a and a housing 48a. During a measurement process, a user—not shown in more detail—moves the hand-held locating appliance 40a along a measurement object, preferably along a wall, a ceiling or a floor in a building, on the rollers 46a. Therefore, the hand-held locating appliance 40a is in the form of a hand-held wall locating appliance. The hand-held locating appliance apparatus 10a is arranged within the housing 48a. It sends a transmission signal in a direction that is remote from the display 44a.

Figure 2:
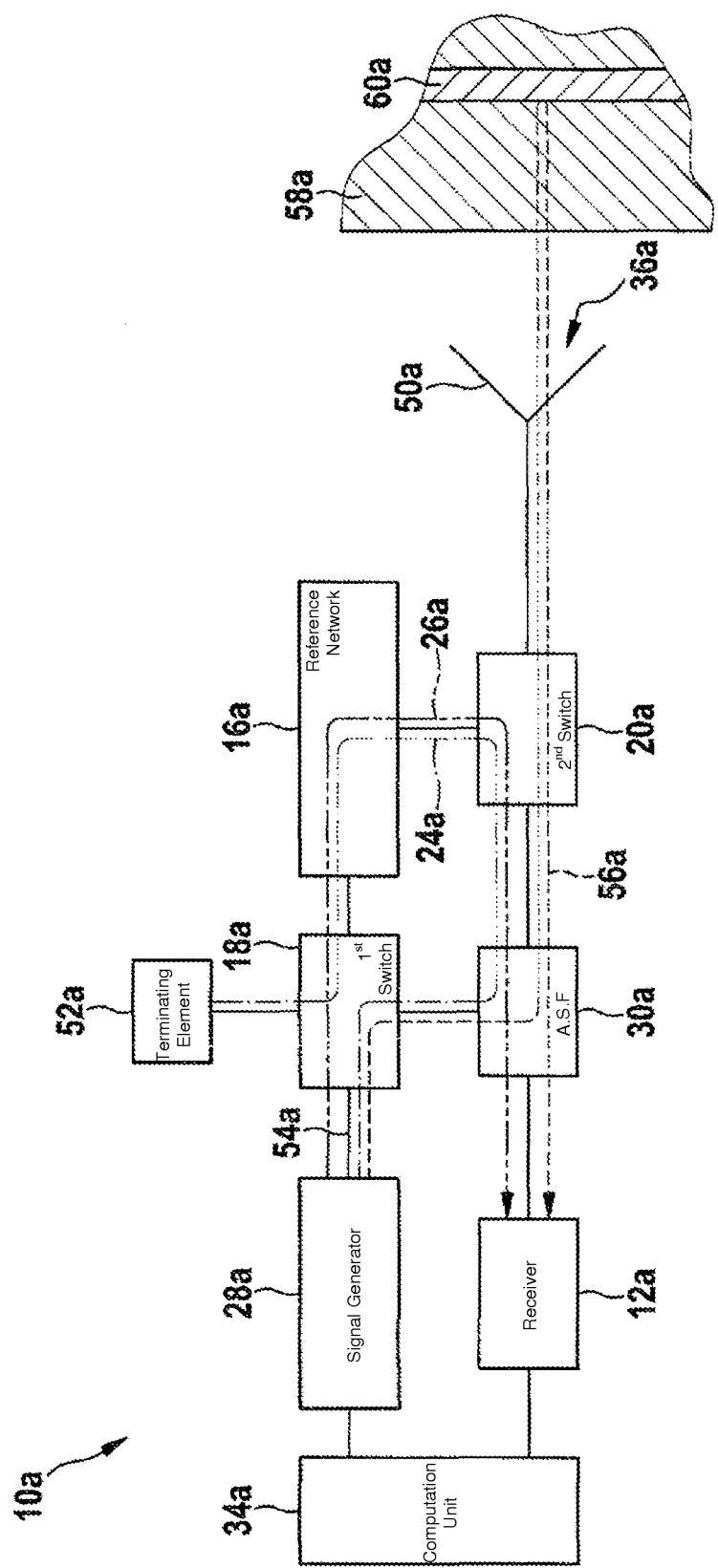
FIG. 2 shows a schematic illustration of the hand-held locating appliance apparatus from FIG. 1 with a transmission and/or reception channel.

As FIG. 2 shows, the hand-held locating appliance apparatus 10a has a receiver 12a, a reference network 16a, a first switch 18a, a second switch 20a, a signal generator 28a, an antenna separating filter 30a, a computation unit 34a, an antenna 50a and a terminating element 52a. The signal generator 28a produces a signal which is in the form of a radio-frequency ultra wideband radio-frequency signal. The signal is used as a transmission signal and as a reference signal. The radio-frequency signal has a bandwidth of greater than 500 MHz. A line 54a in the hand-held locating appliance apparatus 10a connects the signal generator 28a to the first switch 18a. The line 54a is, like all the lines shown, which are not denoted in more detail, provided to transmit the ultra wideband radio-frequency signal.

The first switch 18a is connected to the reference network 16a, to the antenna separating filter 30a and to the terminating element 52a. Alternatively, a first switch could have a terminating element. The first switch 18a is in the form of a semiconductor switch. In a first switching state, it switches a conductive connection between the signal generator 28a and the antenna separating filter 30a and between the reference network 16a and the terminating element 52a. In a second switching state, the first switch 18a switches a conductive connection between the signal generator 28a and the reference network 16a. Hence, the first switch 18a is operatively arranged between the signal generator 28a and the reference network 16a. In the second switching state, the first switch 18a connects the antenna separating filter 30a to the terminating element 52a. The terminating element 52a absorbs incoming signals largely without reflection. Instead of the terminating element 52a, an attenuator in the reference network 16a could suppress reflections arising on the open port of the switch 18a in the first switching state.

The antenna separating filter 30a is in the form of a directional coupler, specifically in the form of a three-port network. It is connected to the receiver 12a, to the first switch 18a and to the second switch 20a. The antenna separating filter 30a couples a signal coming from the first switch 18a onward essentially only in the direction of the second switch 20a. A small, unintentional component of the signal is coupled by the antenna separating filter 30a in the direction of the receiver 12a. This component is subsequently denoted by crosstalk $R_A$. The antenna separating filter 30a couples signals coming from the second switch 20a, that is to say a reference signal and a received signal, onward essentially only in the direction of the receiver 12a.

The second switch 20a is connected to the reference network 16a, the antenna separating filter 30a and the antenna 50a. In a first switching state, the second switch 20a connects the reference network 16a to the antenna separating filter 30a. Hence, the second switch 20a is operatively arranged between the reference network 16a and the antenna separating filter 30a. In a second switching state, the second switch 20a connects the antenna 50a to the antenna separating filter 30a.

The signal generator 28a, the antenna separating filter 30a and the antenna 50a together form a transmission channel. In addition, the transmission channel could have a filter, a balancing element, an amplifier, a modulator and/or other elements which appear meaningful to a person skilled in the art. The antenna 50a, the antenna separating filter 30a and the receiver 12a together form a reception channel. In addition, the reception channel could have a filter, a balancing element, an amplifier, a mixer, an intermediate-frequency filter, a demodulator and/or other elements which appear meaningful to a person skilled in the art. The transmission channel and the reception channel are partly in integral form as a transmission and reception channel 36a. Hence, the hand-held locating appliance apparatus 10a is of single-channel design.

A transmission and reception path 56a runs from the signal generator 28a via the first switch 18a, via the antenna separating filter 30a, via the second switch 20a to the antenna 50a. From there, the transmission and reception path 56a is formed by a radio channel, which extends from the antenna 50a through a portion of a measurement object 58a to a reflector 60a on the measurement object 58a. The reflector 60a reflects a locating signal that runs along the transmission and reception path 56a back to the antenna 50a. Prior to the antenna 50a, the transmission and reception path 56a runs via the second switch 20a to the antenna separating filter 30a and via the antenna separating filter 30a on to the receiver 12a.

The two switches 18a, 20a connect two different reference signal paths 24a, 26a to the reference network 16a in two different operating states in order to determine reference signals. The reference single paths 24a, 26a are different in part than the transmission and reception path 56a. The first reference signal path 24a runs from the signal generator via the first switch 18a, via the antenna separating filter 30a, via the second switch 20a to the reference network 16a. From the reference network 16a, the first reference signal path 24a runs to the terminating element 52a. The first reference signal path 24a ends in the terminating element 52a. Alternatively, the first reference signal path 24a could also end unterminated, with reflections being largely prevented by an attenuator in the reference network 16a. Since the first reference signal path 24a runs via the antenna separating filter 30a and at the same time the second switch 20a decouples the antenna 50a from the antenna separating filter 30a, a reference signal running via the first reference signal path 24a can be used to determine the crosstalk $R_A$ of the antenna separating filter 30a from the transmission path to the reception path.

The second reference signal path 26a runs from the signal generator via the first switch 18a, via the reference network 16a, via the second switch 20a, via the antenna separating filter 30a, to the receiver 12a. The reference network 16a has—not shown in more detail—an attenuator and two balancing elements. The attenuator is in the form of a pi-attenuator matched to a characteristic impedance. The balancing elements are in the form of baluns. Hence, the reference signal path 26a has essentially the same environment-dependent properties as the transmission and reception path 26a without a dependency on the radio channel. Hence, the two switches 18a, 20a are provided to switch the reference signal path 26a to determine a normalization signal $R_M$.

The receiver 12a has a demodulator and an analog-to-digital converter. The demodulator transfers a received signal F to a center frequency and to a bandwidth which the analog-to-digital converter can process. The receiver 12a and the signal generator 28a are connected to the computation unit 34a. The computation unit 34a is in the form of a digital signal processor (DSP). During locating, the computation unit 34a controls the signal generator 28a such that it outputs a signal. The signal passes through the transmission and reception path 26a and is digitized by the analog-to-digital converter. The computation unit 34a evaluates a signal delay between the signal generator 28a and the receiver 12a. This signal delay is dependent on a length of the radio channel and disturbance variables such as a temperature, a humidity and other disturbance variables for the transmission and reception path 56a. In addition, a portion of a transmission power acts directly on the receiver 12a via the antenna separating filter 30a.

In real time with a locating operation, the computation unit 34a determines the crosstalk $R_A$ and the normalization signal $R_M$. The computation unit 34a has computation routines for determining a temperature-compensated received signal $F_{comp}$. In addition, the computation unit 34a has a memory which stores a calibration signal $R_{M,Ref}$ that is picked up under particular external conditions. The calibration signal $R_{M,Ref}$ has been picked up in a climatic chamber, for example. The temperature-compensated received signal $F_{comp}$ is calculated in the frequency domain from the received signal F on the basis of the following specification:

$$F_{comp} = (F - R_A)(R_{M,Ref}/R_M)$$

$F_{comp}$: temperature-compensated received signal
F: received signal
$R_A$: crosstalk
$R_{M,Ref}$: calibration signal
$R_M$: normalization signal The computation unit 34a subtracts the crosstalk $R_A$ from the received signal F in the time domain. Subtraction is possible both in the time domain and in the frequency domain. The result is convoluted by the computation unit 34a with a normalization factor using a fast convolution. That is to say that the computation unit 34a transforms the result of the subtraction and the normalization signal $R_M$ to the frequency domain, specifically using fast Fourier transformation (FFT). The calibration signal $R_{M,Ref}$ is stored in the memory in the frequency domain. The computation unit 34a multiplies the result of the subtraction by the calibration signal $R_{M,Ref}$ in the frequency domain and divides it by the normalization signal $R_M$, specifically each in complex form. Next, the computation unit 34a transforms the final result, that is to say the temperature-compensated received signal to the time domain, specifically using inverse fast Fourier transformation. From the temperature-compensated received signal in the time domain, the computation unit 34a determines the signal delay between the signal generator 28a and the receiver 12a, and from this determines a distance between the antenna 50a and the reflector 60a. Hence, the computation unit 34a is provided to transform a profile of one of the signals to the frequency domain.

FIG. 3 shows a further exemplary embodiment of the disclosure. The descriptions below and the drawings are essentially limited to the differences between the exemplary embodiments, with reference also being able to be made, in principle, to the drawings and/or the description of the other exemplary embodiments for parts having the same designation, particularly for parts having the same reference symbols. In order to distinguish between the exemplary embodiments, the letter a has been placed after the reference symbols for the exemplary embodiment in FIGS. 1 and 2. In the exemplary embodiment in FIG. 3, the letter a has been replaced by the letter b.

FIG. 3 shows a hand-held locating appliance apparatus 10b according to the disclosure which comprises a first receiver 12b, a second receiver 14b, a reference network 16b, a first switch 18b, a first second switch 20b, a second second switch 22b, a signal generator 28b, a first antenna separating filter 30b and a second antenna separating filter 32b. These parts form two essentially separate transmission and reception channels 36b, 38b, specifically one of the receivers 12b, 14b, one of the second switches 20b, 22b and one of the antenna separating filters 30b, 32b each form a portion of the two essentially separate transmission and reception channels 36b, 38b. The transmission and reception channels 36b, 38b are provided to form a portion of two transmission and reception paths 56b.

The first switch 18b is connected to the signal generator 28b and to the two antenna separating filters 30b, 32b. The first switch 18b routes a transmission signal or the reference signals either to the first antenna separating filter 30b of the first transmission and reception channel 36b or to the second antenna separating filter 32b of the second transmission and reception channel 38b. The second switches 20b, 22b are each connected to the reference network 16b, to one of the antenna separating filters 30b, 32b and to one of two antennas 50b of the hand-held locating appliance apparatus 10b. The second switches 20b, 22b route a transmission signal from the respective antenna separating filter 30b, 32b on to the respective antenna 50b.

Each of the second switches 20b, 22b together with the first switch 18b connects two different reference signal paths 24b, 26b to the reference network 16b in two different operating states in order to determine reference signals. Each of the reference signal paths 24b, 26b is used to determine crosstalk $R_{A,1}$ or $R_{A,2}$ from one of the antenna separating filters 30b, 32b and to determine a normalization signal, $R_{M,1}$ or $R_{M,2}$. The first reference signal path 24b runs from the signal generator 28b via the first switch 18b, via the first antenna separating filter 30b of the first transmission and reception channel 36b, via the first second switch 20b, via the reference network 16b, via the second second switch 22b, via the second antenna separating filter 32b to the second receiver 14b. If the first reference signal path 24b is connected, the computation unit 34b can use the first receiver 12b to determine crosstalk $R_{A,1}$ from the first antenna separating filter 30b. At the same time, the computation unit 34b can use the second receiver 14b to determine the normalization signal $R_{M,2}$.

In order to connect the second reference signal path 26b, the signal generator 28b is connected to the second antenna separating filter 32b. The positions of the second switches 20b are the same as in the case of the connection of the first reference signal path 24b. Hence, the switches 18b, 20b, 22b are provided to connect the two reference signal paths 24b, 26b via the two antenna separating filters 30b, 32b. If the second reference signal path 26b is connected, the computation unit 34b can use the second receiver 14b to determine crosstalk $R_{A,2}$ from the second antenna separating filter 32b. At the same time, the computation unit 34b can use the first receiver 12b to determine the normalization signal $R_{M,1}$.

A temperature-compensated received signal $F_{comp}$ can be calculated for each transmission and reception channel 36b, 38b separately after the reference signal paths 24b, 26b have been used to determine crosstalk $R_{A,1}$, $R_{A,2}$ and a normalization signal $R_{M,1}$, $R_{M,2}$ for both transmission and reception channels 36b, 38b according to the method described in the other exemplary embodiment.

The invention claimed is:

1. A hand-held locating apparatus for detecting an object in a medium, the hand-held locating apparatus comprising:
   a signal generator having an output, the signal generator being configured to generate a locating signal at the output of the signal generator;
   a first receiver having an input, the first receiver being configured to convert signals received at the input of the first receiver into digital signals;
   a first antenna configured to transmit the locating signal and receive a first measurement signal, the first measurement signal including reflections of the locating signal off an object in the medium;
   a reference network having a first port and a second port, the second port being connected to a first switch, the reference network including a filter, a balancing element, and an attenuator configured to form a circuit between the first port and the second port that emulates a channel for signals transmitted and received by the first antenna with reference to a predetermined disturbance variable in the channel;
   a first separating filter having a first port connected to a second switch, a second port connected to the first switch, and third port connected to the input of the receiver, the first separating filter being configured to couple signals received at the first port to the second port and to couple signals received at the second port to the third port;

the first switch configured to, in a first switching state of the first switch, connect the second port of the first separating filter to the second port of the reference network and, in a second switching state of the first switch, connect the second port of the first separating filter to the antenna; and the second switch configured to, in a first switching state of the second switch, connect the output of the signal generator to the first port of the first separating filter.

2. The hand-held locating apparatus as claimed in claim 1, wherein:

a first transmission and reception path is defined from the signal generator to the first separating filter to first antenna, emitting from the first antenna and reflecting back to the first antenna to first separating filter and to the receiver, the first reference signal path being formed when the first switch is in the second switching state of the first switch and the second switch is in the first switching state of the second switch; and the hand-held locating apparatus further comprises a computation unit connected to the signal generator and to the first receiver, the computation unit being configured to, when the first transmission and reception path is formed, (i) operate the signal generator to generate the locating signal, (ii) receive the first measurement signal via the first receiver, and (iii) detect the object based on the first measurement signal.

3. The hand-held locating apparatus as claimed in claim 1, further comprising:

a terminating element having an input, the terminating element being configured to absorb signals at the input of the terminating element and minimize reflection of the signals at the input of the terminating element, wherein the second switch is further configured to, (i) in the first switching state of the second switch, connect the input of the terminating element to the first port of the reference network and, (ii) in a second switching state of the second switch, connect the input of the terminating element to the first port of the first separating filter and connect the output of the signal generator to the first port of the reference network.

4. The hand-held locating apparatus as claimed in claim 2, wherein:

a first reference signal path is defined from the signal generator to the first separating filter and to the reference network, the first reference signal path being formed when the first switch is in the first switching state of the first switch and the second switch is in the first switching state of the second switch; and the computing unit is configured to, when the first reference signal path is formed, (i) operate the signal generator to generate the locating signal, (ii) receive a crosstalk signal via the first receiver, and (iii) determine a crosstalk between the first reference signal path and the first receiver, the crosstalk being a coupling of signals received at the first port of the first separating filter to the first receiver.

5. The hand-held locating apparatus as claimed in claim 4, wherein:

the second switch is configured to, in a second switching state of the second switch, connect the output of the signal generator to the first port of the reference network;

a second reference signal path is defined from the signal generator to reference network to the first separating filter to the first receiver, the second reference signal path being formed when the first switch is in the first switching state of the first switch and the second switch is in the second switching state of the second switch; and the computing unit is configured to, when the second reference signal path is formed, (i) operate the signal generator to generate the locating signal, (ii) receive a normalization signal via the first receiver and (iii) determine a normalization factor, the normalization signal being the locating signal passed through the reference network to emulate the first measurement signal when no object is present in the medium, the normalization factor being a quotient representing a component of the normalization signal.

6. The hand-held locating apparatus as claimed in claim 5, wherein the computing unit is further configured to determine a compensated first measurement signal by modifying the first measurement signal received from the first antenna based on the determined crosstalk and the determined normalization factor.

7. The hand-held locating apparatus as claimed in claim 2, wherein the computation unit is further configured to convert the first measurement signal received from the first antenna from a time-domain to a frequency domain.

8. The hand-held locating apparatus as claimed in claim 1, further comprising:

a second receiver having an input, the second receiver being configured to convert signals received at the input of the second receiver into digital signals;

a second antenna configured to transmit the locating signal and receive a second measurement signal, the second measurement signal including reflections of the locating signal off an object in the medium;

a second separating filter having a first port connected to the second switch, a second port connected to a third switch, and third port connected to the input of the second receiver, the second separating filter being configured to couple signals received at the first port to the second port and to couple signals received at the second port to the third port the third switch configured to, (i) in a first switching state of the third switch, connect the second port of the second separating filter to the first port of the reference network and, (ii) in a second switching state of the third switch, connect the second port of the second separating filter to the second antenna, wherein the second switch is further configured to, in the first switching state of the second switch, connect the signal generator to the first port of the second separating filter.

9. The hand-held locating apparatus as claimed in claim 8, wherein the computation unit is configured to determine a crosstalk and a normalization factor simultaneously.

* * * * *